United States Patent
Inoue

(10) Patent No.: US 10,910,964 B2
(45) Date of Patent: Feb. 2, 2021

(54) LAUNDRY TREATMENT APPARATUS

(71) Applicant: LG ELECTRONICS INC., Seoul (KR)

(72) Inventor: Hiroyuki Inoue, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 413 days.

(21) Appl. No.: 15/564,115

(22) PCT Filed: Sep. 25, 2015

(86) PCT No.: PCT/KR2015/010203
§ 371 (c)(1),
(2) Date: Oct. 3, 2017

(87) PCT Pub. No.: WO2016/163606
PCT Pub. Date: Oct. 13, 2016

(65) Prior Publication Data
US 2018/0083556 A1    Mar. 22, 2018

(30) Foreign Application Priority Data
Apr. 6, 2015 (KR) ........................ 10-2015-0048311

(51) Int. Cl.
*D06F 37/30* (2020.01)
*H02P 5/51* (2016.01)
(Continued)

(52) U.S. Cl.
CPC ................ *H02P 5/51* (2016.02); *D06F 34/28* (2020.02); *D06F 37/22* (2013.01); *D06F 37/266* (2013.01);
(Continued)

(58) Field of Classification Search
CPC .......... H02P 5/51; D06F 37/22; D06F 37/266; D06F 39/005; D06F 37/04; D06F 37/304; D06F 58/08; H02K 1/2786
(Continued)

(56) References Cited

U.S. PATENT DOCUMENTS 3,840,764 A * 10/1974 Burger ................... H02K 17/16
                                                          310/185
4,182,027 A *  1/1980 Benezech ............ H02K 1/2786
                                                          156/297
(Continued)

FOREIGN PATENT DOCUMENTS

EP     2127932 A1 * 12/2009 ............... B60K 6/26
EP     2127932 A1    12/2009
(Continued)

OTHER PUBLICATIONS

Oya, Akiyoshi; "Stator for Rotary Electric Machine and Motor", Jan. 2010, JP 2010-017032—Machine Translation (Year: 2010).*

*Primary Examiner* — David G Cormier
*Assistant Examiner* — Thomas Bucci
(74) *Attorney, Agent, or Firm* — Dentons US LLP

(57) ABSTRACT

A laundry treatment apparatus is disclosed. The laundry treatment apparatus includes a cabinet (100) defining the appearance of the laundry treatment apparatus, a drum (300) rotatably disposed in the cabinet (100), and a drive unit (400) for rotating the drum (300), wherein the drive unit (400) includes a first drive unit (410) for generating rotational force required to rotate the drum (300), and a second drive unit (430) for changing the ratio of rotational force generated by the first drive unit (410) and rotational force transferred to the drum (300), wherein the first drive unit (410) includes a first stator (411) for generating rotating magnetic fields, a magnetic flux converter (413) rotatably disposed radially outside the first stator (411) to change the
(Continued)

magnetic flux of the magnetic fields generated by the first stator (411), and a first rotor (415) disposed radially outside the magnetic flux converter (413) and rotatable by the magnetic fields, wherein the magnetic flux converter (413) is configured to rotate with the second drive unit (430).

10 Claims, 8 Drawing Sheets

(51) Int. Cl.
    *H02K 16/00*     (2006.01)
    *H02K 7/11*     (2006.01)
    *D06F 34/28*     (2020.01)
    *D06F 37/22*     (2006.01)
    *D06F 37/26*     (2006.01)
    *D06F 58/08*     (2006.01)
    *D06F 37/04*     (2006.01)
    *H02K 1/27*     (2006.01)

(52) U.S. Cl.
    CPC ............... *D06F 58/08* (2013.01); *H02K 7/11* (2013.01); *H02K 16/00* (2013.01); *D06F 37/04* (2013.01); *D06F 37/304* (2013.01); *H02K 1/2786* (2013.01)

(58) Field of Classification Search
    USPC .. 68/12.16, 140, 24, 3 R, 12.24, 133, 12.02, 68/212, 12.01; 310/114, 266, 156.12, 310/179, 156.01, 156.43
    See application file for complete search history.

(56) References Cited

U.S. PATENT DOCUMENTS

| | | | | |
|---|---|---|---|---|
| 5,038,065 A * | 8/1991 | Matsubayashi | ........ | H02K 21/14 310/156.15 |
| 5,386,161 A * | 1/1995 | Sakamoto | ............. | H02K 37/12 310/156.12 |
| 5,751,089 A * | 5/1998 | Stridsberg | ............. | H02K 1/185 310/266 |
| 5,778,703 A * | 7/1998 | Imai | ......................... | D06F 37/40 68/12.02 |
| 5,783,893 A * | 7/1998 | Dade | ...................... | H02K 16/00 310/114 |
| 5,818,144 A * | 10/1998 | Kim | ...................... | D06F 37/304 310/266 |
| 5,931,029 A * | 8/1999 | Kim | ......................... | D06F 17/06 68/134 |
| 6,181,047 B1* | 1/2001 | Nitta | ..................... | D06F 37/304 310/216.001 |
| 6,257,027 B1* | 7/2001 | Imai | ..................... | D06F 37/304 68/12.12 |
| RE37,576 E * | 3/2002 | Stephens | .................. | H02K 3/18 310/254.1 |
| 6,459,185 B1* | 10/2002 | Ehrhart | .................... | H02K 1/20 310/156.35 |
| 6,531,801 B1* | 3/2003 | Blazek | .................. | D06F 37/304 310/166 |
| 6,717,314 B2* | 4/2004 | Horst | ..................... | D06F 37/304 310/156.01 |
| 7,119,468 B2* | 10/2006 | Shkondin | ................ | B60L 50/20 310/114 |
| 7,911,110 B2* | 3/2011 | Choi | ........................ | H02K 1/27 310/266 |
| 8,044,548 B2* | 10/2011 | Sakai | ..................... | H02K 21/16 310/156.43 |
| 8,076,812 B2* | 12/2011 | Hiroshi | ................ | H02K 1/2766 310/156.38 |
| 8,354,766 B2* | 1/2013 | Maekawa | ............. | H02K 21/22 310/156.43 |
| 8,739,581 B2* | 6/2014 | Shiga | .................... | D06F 37/304 68/140 |
| 9,124,161 B2* | 9/2015 | Kim | ....................... | H02K 16/04 |
| 9,407,116 B2* | 8/2016 | Kondou | ................ | H02K 1/276 |
| 2002/0116961 A1* | 8/2002 | Kim | ........................ | D06F 37/40 68/23.7 |
| 2004/0245878 A1* | 12/2004 | Kim | ........................ | H02K 1/18 310/114 |
| 2006/0042022 A1* | 3/2006 | Kim | ..................... | D06F 37/304 8/159 |
| 2006/0049705 A1* | 3/2006 | Matsubara | ............. | H02K 7/063 310/81 |
| 2006/0091754 A1* | 5/2006 | Kim | ....................... | H02K 15/03 310/156.55 |
| 2006/0103253 A1* | 5/2006 | Shiga | .................... | H02K 1/2786 310/156.45 |
| 2006/0108887 A1* | 5/2006 | Nitta | ..................... | D06F 37/304 310/156.53 |
| 2006/0113859 A1* | 6/2006 | Lu | ........................... | H02K 21/22 310/216.015 |
| 2007/0096574 A1* | 5/2007 | Romagny | ............... | B60L 50/16 310/112 |
| 2007/0205682 A1* | 9/2007 | Choi | ...................... | H02K 7/14 310/114 |
| 2007/0236099 A1* | 10/2007 | Kim | ...................... | H02K 3/524 310/266 |
| 2008/0246359 A1* | 10/2008 | Lee | ........................ | H02K 1/30 310/112 |
| 2009/0064726 A1* | 3/2009 | Choi | ........................ | H02K 1/18 68/140 |
| 2009/0064728 A1* | 3/2009 | Choi | ........................ | H02K 1/18 68/140 |
| 2009/0091204 A1* | 4/2009 | Koshiba | ................ | H02K 16/02 310/114 |
| 2009/0115278 A1* | 5/2009 | Choi | ........................ | H02K 21/12 310/156.12 |
| 2009/0115361 A1* | 5/2009 | Nitta | .................... | H02K 1/2786 318/400.09 |
| 2010/0058817 A1* | 3/2010 | Yoshikawa | ........... | D06F 37/304 68/139 |
| 2010/0126234 A1* | 5/2010 | Maekawa | ............. | H02K 29/03 68/28 |
| 2010/0307201 A1* | 12/2010 | Shiga | ...................... | D06F 37/30 68/140 |
| 2011/0285238 A1* | 11/2011 | Kusase | .................. | H02K 16/04 310/156.48 |
| 2012/0062078 A1* | 3/2012 | Shiga | ..................... | H02K 29/08 310/68 B |
| 2012/0200184 A1* | 8/2012 | Takeuchi | ............... | H02K 16/00 310/112 |
| 2012/0256509 A1* | 10/2012 | Lee | ...................... | H02K 1/2773 310/156.53 |
| 2013/0093275 A1* | 4/2013 | Kim | ....................... | H02K 16/04 310/114 |
| 2013/0099618 A1* | 4/2013 | Kusase | .................. | H02K 23/38 310/156.56 |
| 2013/0160499 A1* | 6/2013 | Kim | ..................... | A47L 15/0018 68/12.16 |
| 2013/0233026 A1* | 9/2013 | Yoon | ........................ | H02K 1/14 68/12.16 |
| 2013/0234553 A1* | 9/2013 | Kusase | .................. | H02K 51/00 310/114 |
| 2014/0028142 A1* | 1/2014 | Kusase | .................. | H02K 21/14 310/198 |
| 2014/0035418 A1* | 2/2014 | Horst | ..................... | H02K 1/187 310/156.12 |
| 2014/0069151 A1* | 3/2014 | Yoon | .................... | H02K 21/028 68/140 |
| 2014/0091662 A1* | 4/2014 | Kim | ....................... | H02K 7/14 310/114 |
| 2014/0305172 A1* | 10/2014 | Kim | ...................... | H02K 21/12 68/131 |
| 2015/0252507 A1* | 9/2015 | Kim | ..................... | D06F 37/304 68/23.6 |
| 2015/0318805 A1* | 11/2015 | Kim | ..................... | D06F 37/306 318/400.02 |

(56) References Cited

U.S. PATENT DOCUMENTS

| | | | |
|---|---|---|---|
| 2015/0330011 A1* | 11/2015 | Kim | H02K 16/00 |
| | | | 318/3 |
| 2016/0006335 A1* | 1/2016 | Ohhashi | H01F 7/0242 |
| | | | 335/306 |
| 2016/0130739 A1* | 5/2016 | Song | D06F 37/40 |
| | | | 8/137 |
| 2016/0156233 A1* | 6/2016 | Yoon | H02K 1/2786 |
| | | | 310/43 |

FOREIGN PATENT DOCUMENTS

| | | | |
|---|---|---|---|
| EP | 2706648 A2 | | 12/2014 |
| JP | 2010017032 A | * | 1/2010 |
| WO | 2014109268 A1 | | 7/2014 |

\* cited by examiner

- Prior art -

[Figure 4]
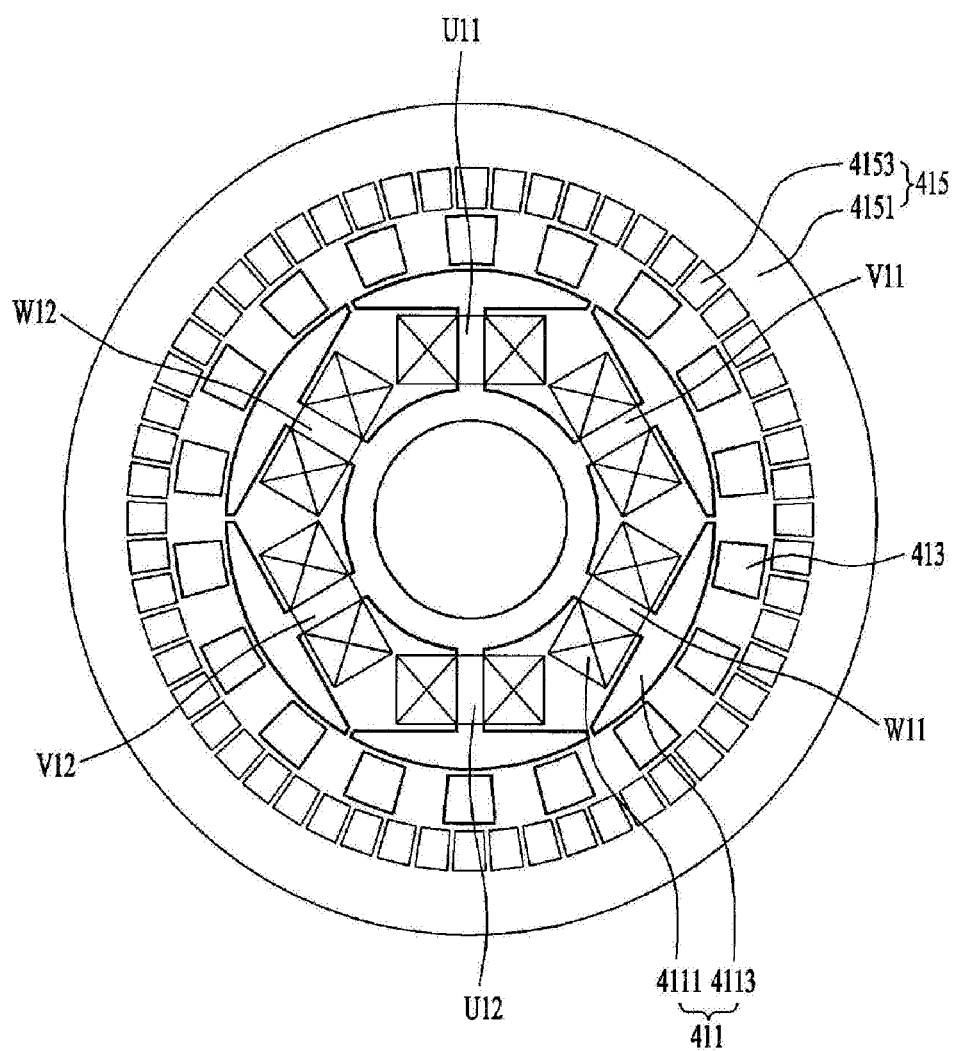

[Figure 5]
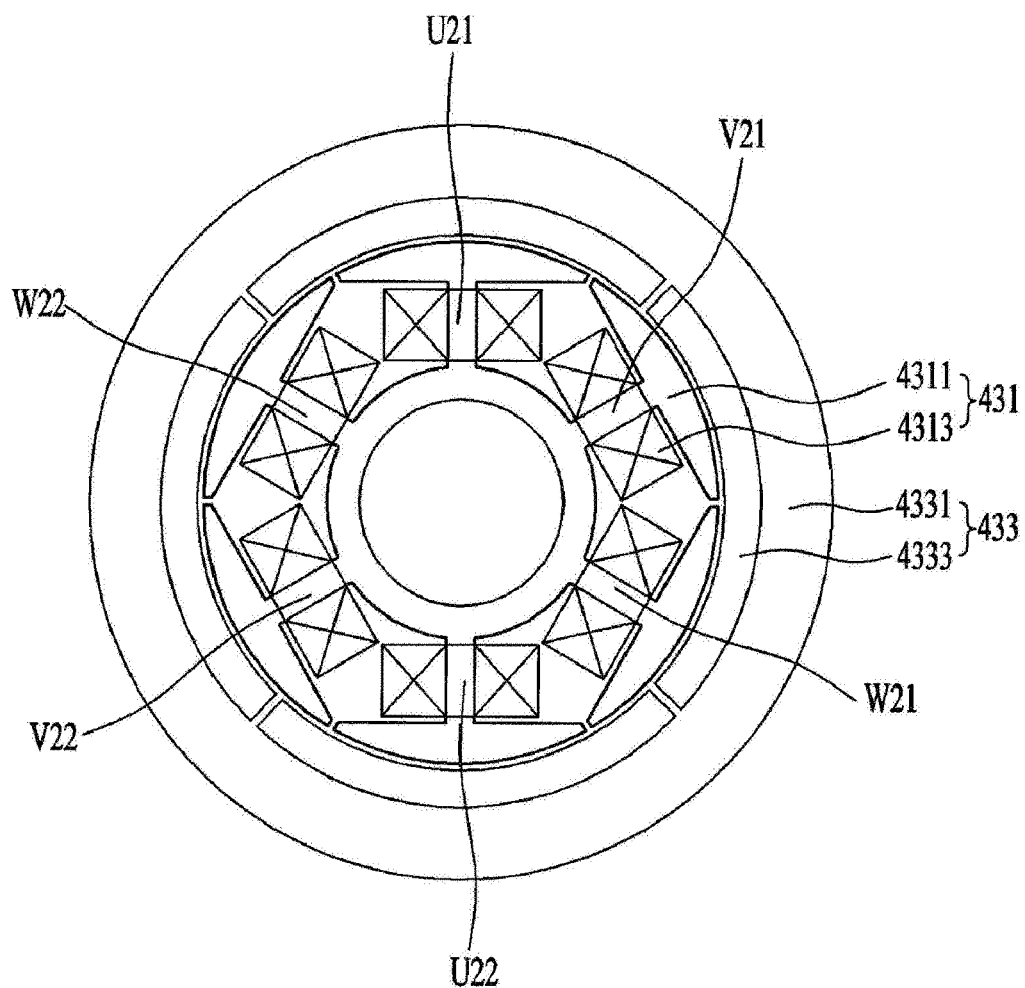

【Figure 6】
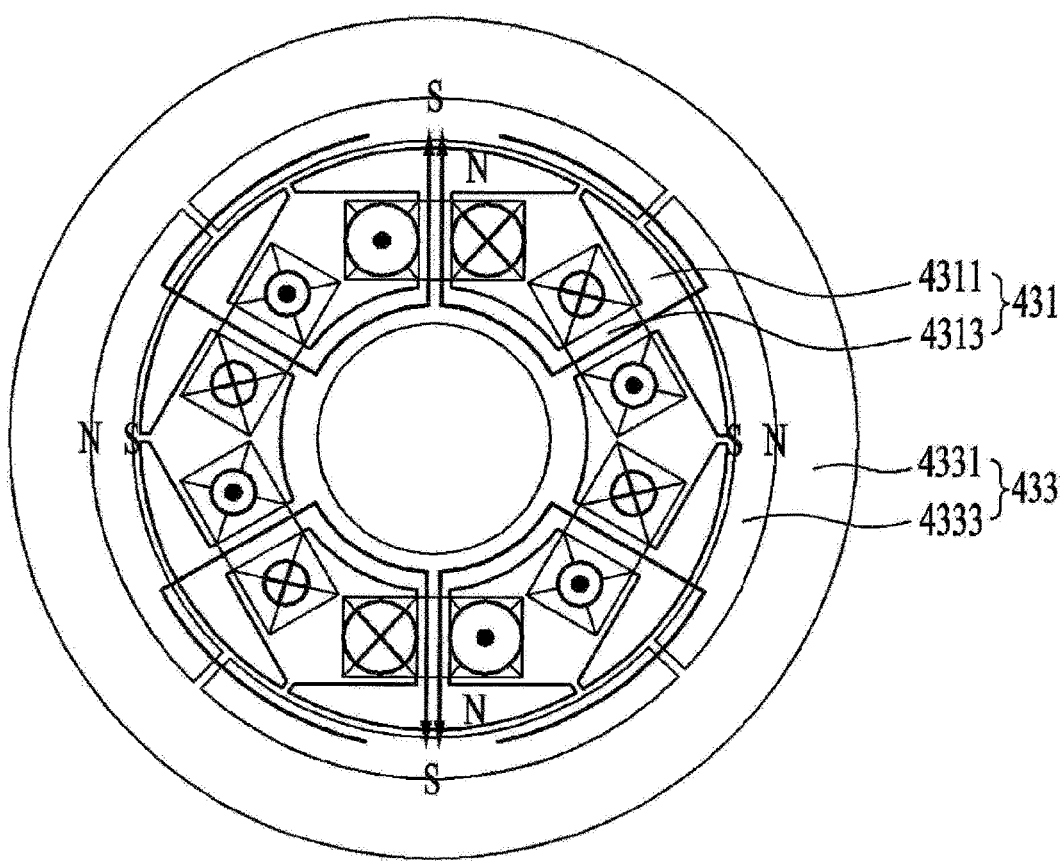

[Figure 7]
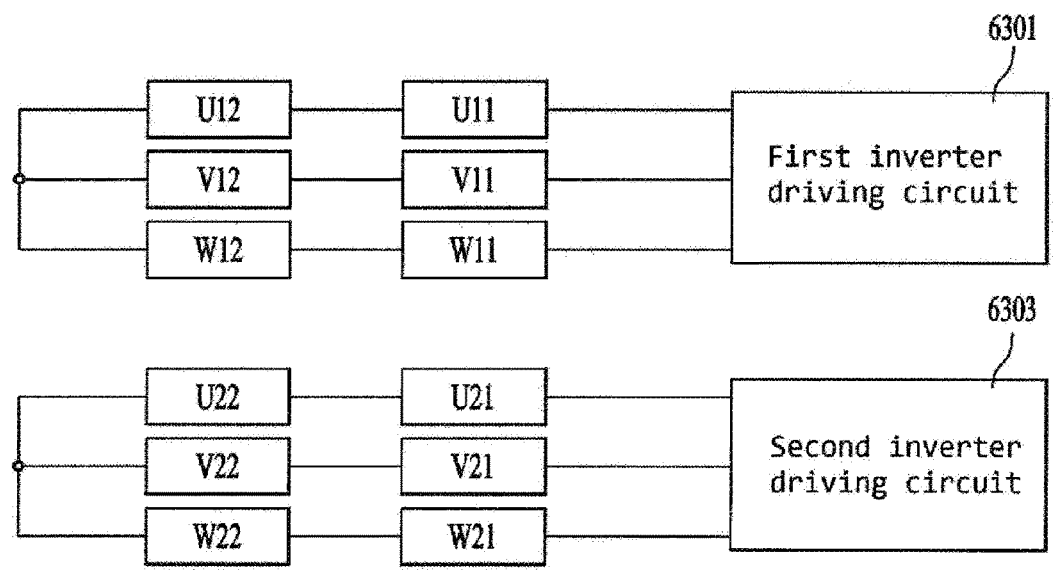
[Figure 8]
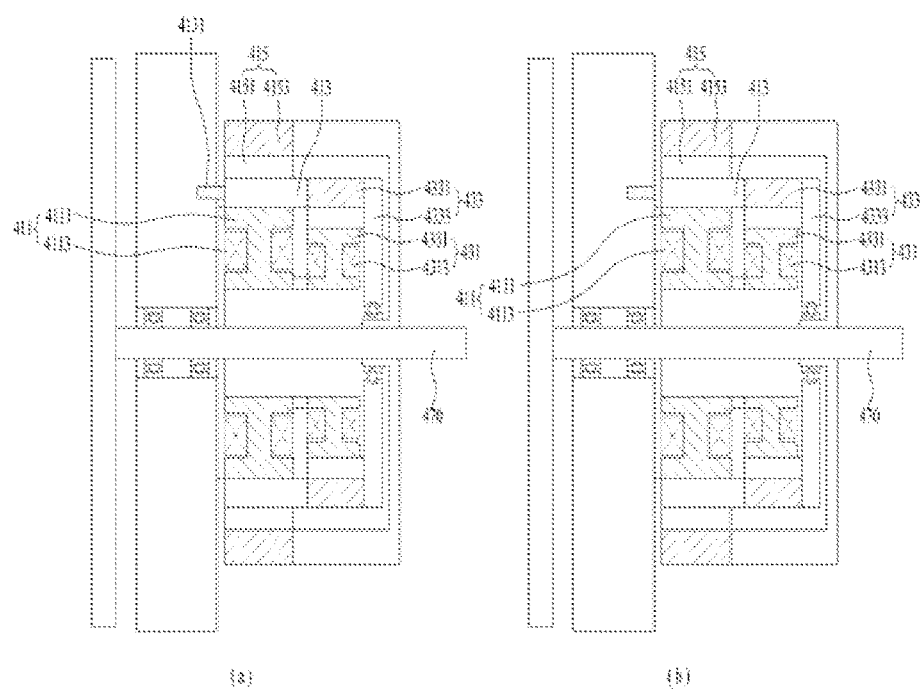

【Figure 9】
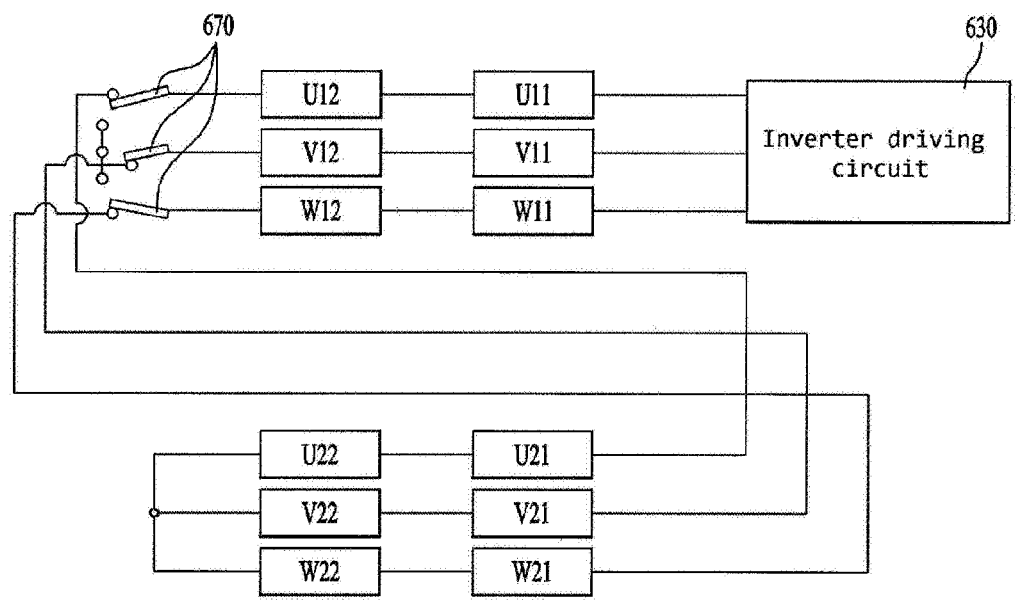

LAUNDRY TREATMENT APPARATUS

This application is a National Stage Entry of International Application No. PCT/KR2015/010203 filed Sep. 25, 2015, and claims the benefit of Korean Application No. 10-2015-0048311 filed Apr. 6, 2015, all of which are hereby incorporated by reference for all purposes as if fully set forth herein.

TECHNICAL FIELD

The present invention relates to a laundry treatment apparatus.

BACKGROUND ART

FIG. 1 is a view showing a conventional belt drive type laundry treatment apparatus.

The conventional laundry treatment apparatus shown in FIG. 1 may include a cabinet 1 defining the appearance of the laundry treatment apparatus, a tub 2 disposed in the cabinet 1 to contain washing water, and a drum 3 rotatably disposed in the tub 2 to contain laundry.

The cabinet 1 and the tub 2 include an introduction port for allowing the inside thereof to communicate with the outside thereof. The laundry treatment apparatus further includes a door 11 for opening and closing the introduction port.

The cabinet 1 further includes springs 4 and a damper 5 to attenuate vibrations generated by the rotation of the drum 3.

The laundry treatment apparatus further includes a power unit 6.

The power unit 6 includes a motor 64 for generating rotational force, a first pulley 62 rotatable by the rotational force generated by the motor 64, a second pulley 63 having a larger diameter than the first pulley 62, a belt 65 for causing the first and second pulleys 62 and 63 to rotate together, and a shaft 61, which is integrally formed at one end thereof with one side of the second pulley 63 and at the other end thereof with the drum 3 to transfer the rotational force, generated by the power unit 6, to the drum 3.

More specifically, in order to transfer the rotational force generated by the motor 64 to the second pulley 63, which has a larger diameter than the first pulley 62, the first pulley 62 and the second pulley 63 are connected to each other via the belt 62 wound therearound. The first and second pulleys 62 and 63, which have different diameters, transfer the low-speed, high-torque rotational force to the drum 3.

The tub 2 further includes a bearing housing 22, and a bearing 21, rotatably provided in the bearing housing 22, in order to reduce the radial load generated during rotation of the shaft 61.

The conventional belt drive reduction mechanism using pulleys has a problem of generation of noise due to rotation of the belt 65. Furthermore, the reduction mechanism has a problem of breakage of the belt 65.

In addition, since space required for rotation of the belt 65 has to be ensured because the first and second pulleys 62 and 63 are provided in the cabinet 1, assembly thereof is difficult.

Furthermore, since the first pulley 62 rotates at a higher speed and the second pulley 63 rotates at a higher torque in the state in which the belt 65 is in contact with the first and second pulleys 62 and 63, friction is generated between the belt 65 and the pulleys 62 and 63, thus deteriorating the motor efficiency.

In addition, since the belt 65 is in contact with the first and second pulleys 62 and 63, there is a problem in that the motor may be burned when excessive load is applied to the power unit 6.

FIG. 2 is a view showing a conventional direct-drive type laundry treatment apparatus.

The conventional laundry treatment apparatus shown in FIG. 2 may include a cabinet 10 defining the appearance of the laundry treatment apparatus, a tub 20 disposed in the cabinet 10 to contain washing water, and a drum 30 rotatably disposed in the tub 20 to contain laundry.

The cabinet 10 further includes springs 40 and a damper 50 in order to attenuate vibrations generated by the rotation of the drum 30.

The cabinet 10 and the tub 20 include an introduction port for allowing the inside thereof to communicate with the outside thereof. The laundry treatment apparatus further includes a door 101 for opening and closing the introduction port.

The laundry treatment apparatus further includes a power unit 60 for rotating the drum 30. The power unit 60 generates rotational force, and rotational force generated by the power unit 60 is transferred to a shaft 601 and is in turn transferred to the drum 30, which is configured to be rotated with the shaft 601.

The tub 2 further includes a bearing housing 202 and a bearing 201, rotatably provided in the bearing housing 202, in order to reduce the radial load generated during rotation of the shaft 601.

The power unit 60 includes a stator 6021 for generating a rotating magnetic field, and a rotor 6023 adapted to be rotated by the rotating magnetic field generated by the stator 6021. Since the conventional direct-drive type laundry treatment apparatus shown in FIG. 2 enables only the rotation of the drum 3, it has to further include gears in order to reduce the speed and thus transfer high torque.

Attempts have been made to reduce the rotational speed of the drum 3 by causing a change in the magnetic flux in the direct-drive type laundry treatment apparatus.

When the drum 3 rotates at a high speed, a change of magnetic flux occurs with a short period at magnets provided in a magnetic flux converter or a rotor. This is problematic in that the magnets provided in the magnetic flux converter or the rotor are heated due to the generation of eddy current, thus deteriorating the efficiency with which the magnetic flux is transmitted.

DISCLOSURE OF INVENTION

Technical Problem

An object of the present invention devised to solve the problem lies on the provision of a laundry treatment apparatus equipped with a drive unit, which is capable of reducing noise caused by vibrations.

Another object of the present invention devised to solve the problem lies on the provision of a laundry treatment apparatus equipped with a drive unit, which is capable of eliminating defects caused by breakage of a belt.

A further object of the present invention devised to solve the problem lies on the provision of a laundry treatment apparatus equipped with a drive unit, which obviates a belt and is thus simple to assemble.

Still another object of the present invention devised to solve the problem lies on the provision of a laundry treatment apparatus equipped with a drive unit, which operates without interference so as to improve the efficiency of the motor.

Yet another object of the present invention devised to solve the problem lies on the provision of a laundry treatment apparatus, which is capable of changing the reduction gear ratio of a single drive unit in order to realize a high-speed rotation mode and a low-speed rotation mode of a drum.

Still yet another object of the present invention devised to solve the problem lies on the provision of a laundry treatment apparatus equipped with a drive unit, which is capable of preventing heating of magnets provided in a magnetic flux converter or a rotor in order to improve transmission efficiency.

Solution to Problem

The object of the present invention can be achieved by providing a laundry treatment apparatus including a cabinet defining an appearance of the laundry treatment apparatus, a drum rotatably disposed in the cabinet, and a drive unit for rotating the drum, wherein the drive unit includes a first drive unit for generating rotational force required to rotate the drum, and a second drive unit for changing a ratio of rotational force generated by the first drive unit and rotational force transferred to the drum, wherein the first drive unit includes a first stator for generating rotating magnetic fields, a magnetic flux converter rotatably disposed radially outside the first stator to change magnetic flux of magnetic fields generated by the first stator, and a first rotor disposed radially outside the magnetic flux converter and rotatable by the magnetic fields, wherein the magnetic flux converter is configured to rotate with the second drive unit.

The second drive unit may include a second stator for generating rotating magnetic fields, and a second rotor rotatable by rotating magnetic fields generated by the second stator.

The laundry treatment apparatus may further include a first inverter driving circuit for supplying current to a first coil, which is wound around the first stator to generate rotating magnetic fields, and a second inverter driving circuit for supplying current to a second coil, which is wound around the second stator to generate rotating magnetic fields, wherein the first inverter driving circuit and the second inverter driving circuit may supply current independently from each other.

When the drum has to be rotated at a predetermined rotational speed or higher, the first inverter driving circuit and the second inverter driving circuit may supply current such that an angular rotational speed of the magnetic flux converter is the same as that of the first rotor.

When the drum has to be rotated below a predetermined rotational speed, the second inverter driving circuit may supply current such that the second rotor is held.

The second inverter driving circuit may supply direct current to the second coil to hold the second rotor.

The laundry treatment apparatus may further include a magnetic flux converter holder for selectively holding the magnetic flux converter.

The laundry treatment apparatus may further include a first coil wound around the first stator to generate rotating magnetic fields, a second coil wound around the second stator to generate rotating magnetic fields, a switch disposed between the first coil and the second coil to selectively release an electrical connection between the first coil and second coil, and an inverter driving circuit for supplying current to the first coil.

When the drum has to be rotated at a predetermined rotational speed or higher, the switch may be controlled to electrically connect the first coil to the second coil.

When the drum has to be rotated below a predetermined rotational speed, the switch may be controlled to release the electrical connection between the first coil and second coil so as to supply current only to the inverter driving circuit.

When the drum has to be rotated below a predetermined rotational speed, the magnetic flux converter holder may hold the magnetic flux converter to prevent rotation of the magnetic flux converter.

Advantageous Effects of Invention

The present invention provides a laundry treatment apparatus equipped with a drive unit, which is capable of reducing noise caused by vibrations.

Furthermore, the present invention provides a laundry treatment apparatus equipped with a drive unit, which is capable of eliminating defects caused by the breakage of a belt.

In addition, the present invention provides a laundry treatment apparatus equipped with a drive unit, which obviates a belt and is thus simple to assemble.

Furthermore, the present invention provides a laundry treatment apparatus, which is provided with a drive unit adapted to operate without interference so as to improve the efficiency of the motor.

In addition, the present invention provides a laundry treatment apparatus, which is capable of changing the reduction gear ratio of a single drive unit in order to realize a high-speed rotation mode and a low-speed rotation mode of a drum.

Furthermore, the present invention provides a laundry treatment apparatus equipped with a drive unit, which is capable of preventing heating of magnets provided in a magnetic flux converter or a rotor in order to improve transmission efficiency.

BRIEF DESCRIPTION OF DRAWINGS

The accompanying drawings, which are included to provide a further understanding of the invention, illustrate embodiments of the invention and together with the description serve to explain the principle of the invention.

In the drawings:

FIGS. 4 and 5 are views showing a drive unit of the laundry treatment apparatus according to the present invention;

FIG. 6 is a view showing a second drive unit of the laundry treatment apparatus according to the present invention;

FIG. 7 is a view showing a current supply of the laundry treatment apparatus according to the present invention;

FIG. 8 is a view showing another embodiment of the drive unit of the laundry treatment apparatus according to the present invention; and FIG. 9 is a view showing another embodiment of the current supply of the laundry treatment apparatus according to the present invention.

BEST MODE FOR CARRYING OUT THE INVENTION

Hereinafter, preferred embodiments of the present invention are described in detail with reference to the accompanying drawings. The embodiments are not limited to the embodiments disclosed hereinafter, but may be embodied in different modes. The embodiments are provided for completeness of disclosure and informing the scope to persons skilled in this field of art. The same reference numbers may refer to the same elements throughout the specification.

Figure 1:
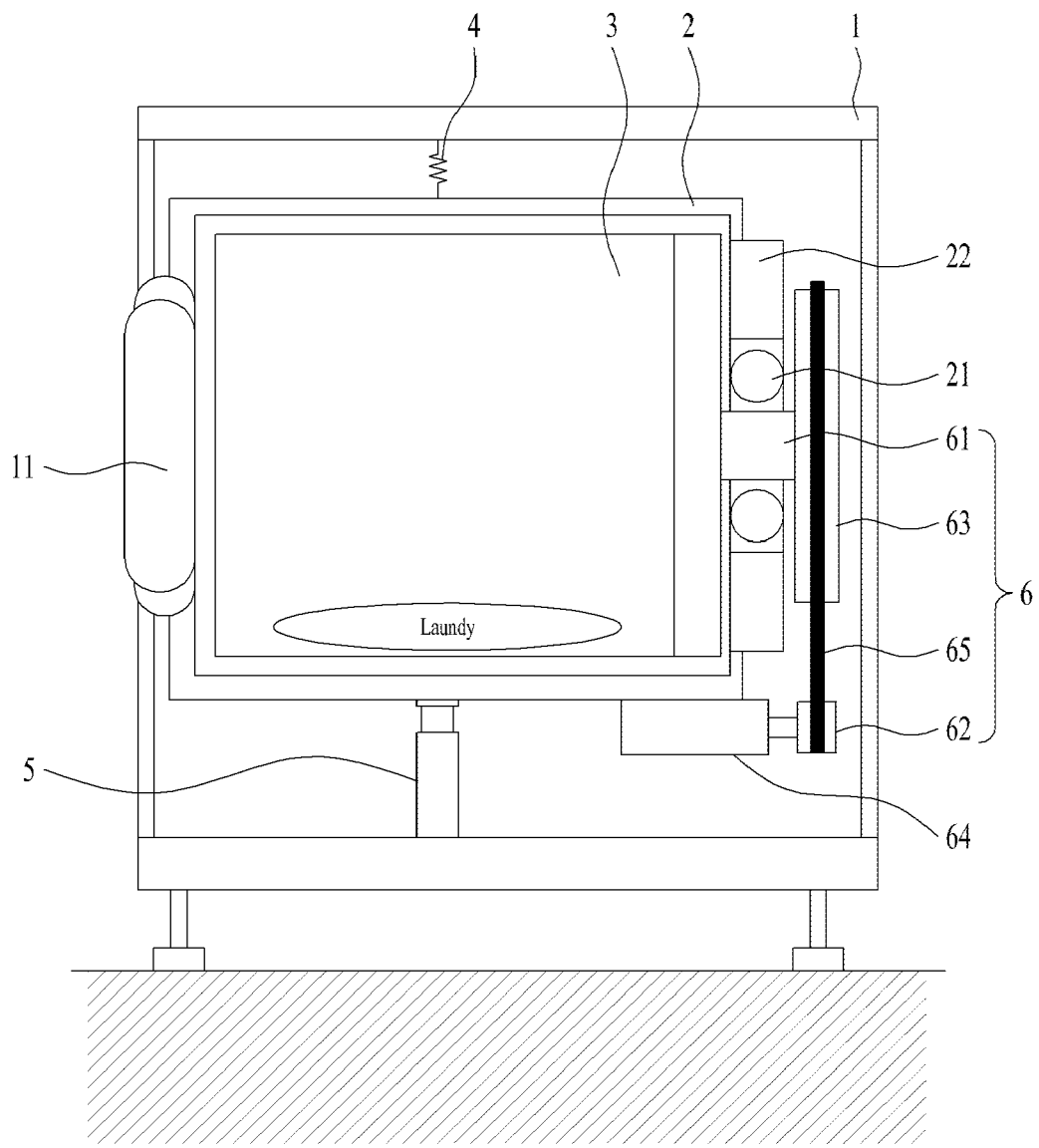
FIG. 1 is a view showing a conventional belt drive type laundry treatment apparatus.
Figure 2:
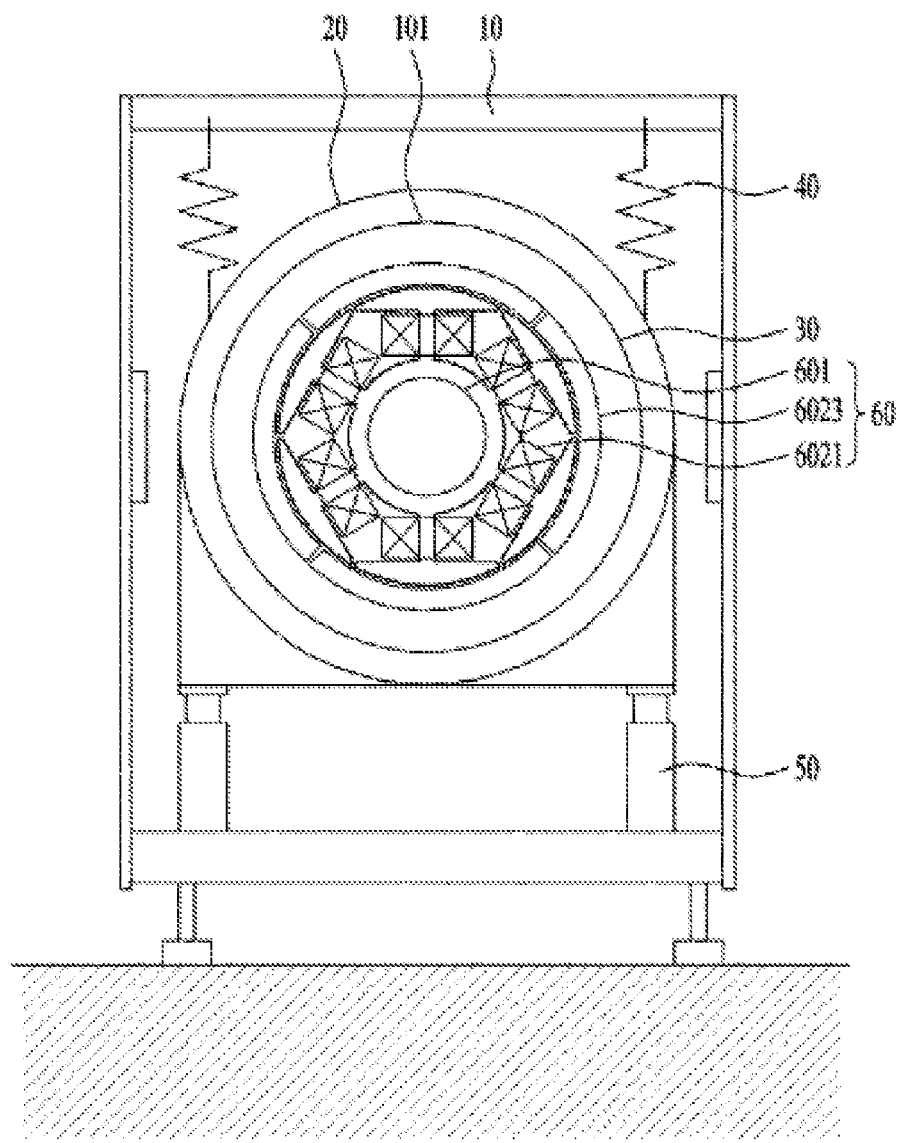
FIG. 2 is a view showing a conventional direct-drive type laundry treatment apparatus.
Figure 3:
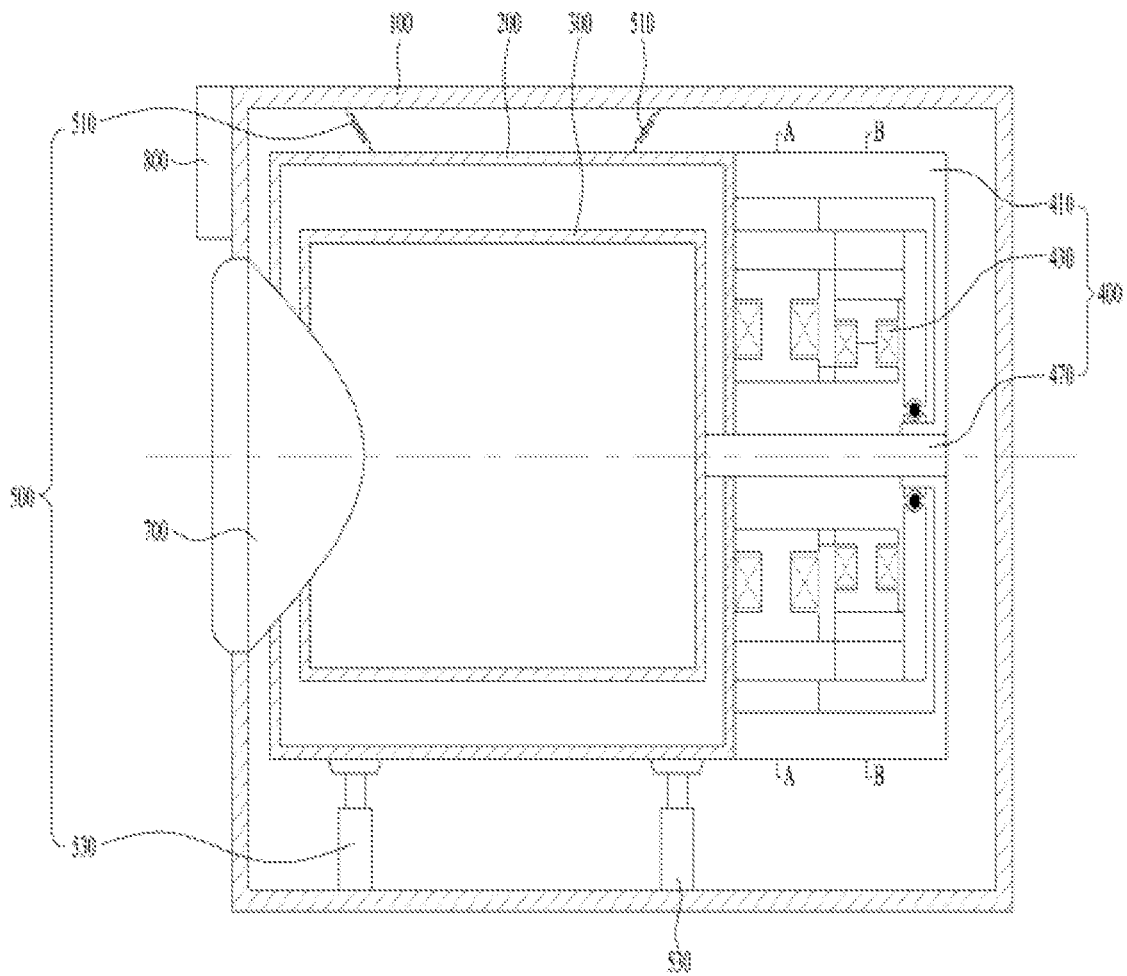
FIG. 3 is a view showing a laundry treatment apparatus according to the present invention.

FIG. 3 is a view showing a laundry treatment apparatus according to the present invention.

In general, laundry treatment apparatuses may be embodied as washing apparatuses for washing laundry, drying apparatuses for drying laundry, or washing and drying apparatuses for carrying out both the washing and drying. In order to be embodied as a washing apparatus, the laundry treatment apparatus has to include a tub 200 for containing washing water. Meanwhile, in order to be embodied as a drying apparatus, the laundry treatment apparatus has to include a tub 200 for drying laundry.

For convenience of explanation, the laundry treatment apparatus according to the present invention will be described as being a washing apparatus equipped with a tub 200. However, it should be noted that the laundry treatment apparatus according to the present invention is not limited to the washing apparatus, and may also be used as a drying apparatus or a washing and drying apparatus.

Referring to FIG. 3, the laundry treatment apparatus according to the present invention may include a cabinet 100 defining the appearance of the laundry treatment apparatus, a tub 200 disposed in the cabinet 100 to contain washing water, a drum 300 rotatably disposed in the tub 200 to contain laundry, a drive unit 400 for generating power required to rotate the drum 300, a vibration damping unit 500 for attenuating vibrations caused by rotation of the drum 300, a door 700 for allowing laundry to be put into or taken out of the drum 300, and a control panel 800 for enabling a user to input operation commands of the laundry treatment apparatus and to check the current operating state of the laundry treatment apparatus.

The cabinet 100 may be configured to have any shape as long as it defines the appearance of the laundry treatment apparatus, and is not limited to the shape shown in FIG. 3.

The drum 300 generates vibrations while it rotates. The vibrations are transmitted to the tub 200, thus causing the tub 200 to vibrate. Due to the vibrations transmitted to the tub 200, a problem occurs in that the tub 200 collides with the cabinet 100.

Accordingly, in order to solve the problem, the laundry treatment apparatus includes the vibration damping unit 500 for attenuating vibrations. The vibration damping unit 500 may include a first vibration damping part 510, made of an elastic material, and a second vibration damping part 530, made of a damping material and serving as a damper.

Referring to FIG. 3, although the first vibration damping part 510 is illustrated as being connected between the upper surface of the tub 200 and the upper surface of the cabinet 100 and the second vibration damping part 530 is illustrated as being connected between the lower surface of the tub 200 and the lower surface of the cabinet 100, the first vibration damping part 510 and the second vibration damping part 530 are not limited to the shape and position shown in FIG. 3. The vibration damping unit 500 may be constructed to have any shape and position as long as it can attenuate vibrations.

In order to allow laundry to be put into or taken out of the drum 300, introduction ports are formed through the tub 200, the drum 300 and the cabinet 100 for communication therebetween.

The door 700 is hingedly coupled to the cabinet to open and close the cabinet. The inner surface of the door 700 is preferably configured to be convex toward the drum 300 so as to prevent laundry and washing water from overflowing from the drum 300 and the tub 200.

Although not shown in the drawing, gaskets (not shown) may be provided between the inner surface of the door 700 and the drum 300 and between the inner surface of the door 700 and the tub 200 so as to prevent laundry and washing water from overflowing and to prevent vibrations generated by the drum 300 from being transmitted to the tub 200 and the cabinet 100.

Although the drawing illustrates the introduction ports provided at the front faces of the cabinet 100, the tub 200 and the drum 300, and the door 700 provided at the front face of the cabinet 100, the structure may be changed into any construction without limitation as long as the door 700 is provided at the cabinet 100 to open and close the introduction ports formed in the cabinet 100, the tub 200 and the drum 300.

In other words, if the drum 300 is configured to be tilted, the introduction ports of the tub 200 and the cabinet 100 will be configured to communicate with the introduction port of the tilted drum 300. Accordingly, the door 700 may also be tilted, not at the front face but at lateral side faces.

The drive unit 400 may include a first drive unit 410 for generating power required to rotate the drum 300 and a second drive unit 430 for converting the rotational force generated by the first drive unit 410.

FIG. 4 is a view showing the first drive unit 410.

Referring to FIG. 4, the first drive unit 410 may include a first stator 411 for generating magnetic fields, a magnetic flux converter 413 for converting the flux of the rotating magnetic fields generated by the stator 411, and a first rotor 415 capable of being rotated by the magnetic flux converted by the magnetic flux converter 413.

The first stator 411 may include a first stator core 4111, which has a hollow center and a plurality of ridges protruding radially outward, and a first coil 4113 wound around the first stator core 4111.

Since the first coil 4113 is supplied with current from a current supply (not shown) and is wound around the first stator core 4111, rotating magnetic fields are generated by the first stator core 4111.

The first rotor 415 may include a first rotor magnet part 4153, disposed at the inner circumference of the first rotor 415 and having a plurality of magnets, and a first rotor housing 4151, for supporting the first rotor magnet part 4153.

The plurality of magnets included in the first rotor magnet part 4153 are preferably disposed such that the magnets with the N poles facing the center of the first drive unit 410 and the magnets with the S poles facing the center of the first drive unit 410 are alternately positioned.

Since the above-mentioned first drive unit 410 is configured to be identical to that of a BLDC motor, which is usually used in the related art, a description thereof is omitted.

FIG. 5 is a view showing the second drive unit 430.

Referring to FIG. 5, the second drive unit 430 may include a second stator 431 for generating rotating magnetic fields and a second rotor 433 capable of being rotated by the rotating magnetic fields generated by the second stator 431.

The second stator 431 may include a second stator core 4311, which has a hollow center and a plurality of ridges protruding radially outward, and a second coil 4313 wound around the second stator core 4311.

The second rotor 433 may include a second rotor magnet part 4333, disposed at the inner circumference of the second rotor 433 and having a plurality of magnets, and a second rotor housing 4331 for supporting the second rotor magnet part 4333.

The plurality of magnets included in the second rotor magnet part 4333 are preferably disposed such that the magnets with the N poles facing the center of the second drive unit 430 and the magnets with the S poles facing the center of the second drive unit 430 are alternately positioned.

The second drive unit 430 differs from the first drive unit 410 in that the component corresponding to the magnetic flux converter 413 is not provided between the second stator 431 and the second rotor 433.

Referring again to FIGS. 3, 4 and 5, the first drive unit 410 may be of the direct drive type, which is constructed to directly rotate a shaft 470 for rotating the drum 300.

Accordingly, the first drive unit 410 is preferably disposed at the rear surface of the drum 300.

The second drive unit 430 may be coupled to the magnetic flux converter 413 of the first drive unit 410.

More specifically, the second rotor housing 4331, which is rotated by the second stator 431, is preferably coupled to the magnetic flux converter 413 to be rotated therewith.

In other words, the first drive unit 410 serves to rotate the shaft 470 and to in turn rotate the drum 300, and the second drive unit 430 serves to rotate the magnetic flux converter 413 without direct contribution to rotation of the drum 300.

The magnetic flux converter 413 serves to change the reduction gear ratio while the rotating magnetic fields generated by the first stator 411 are transferred to the first rotor 415.

The angular rotational speed of the magnetic flux converter 413 and the reduction gear ratio of the first drive unit 410 may be represented by the formula below.

$$Gr = \frac{k \cdot N_s \pm N_h}{N_s \pm N_h} = \frac{\frac{\omega 1}{\omega 2} \cdot N_s \pm N_h}{N_s \pm N_h} \propto \frac{1}{\omega 2}$$

wherein Gr is a reduction gear ratio, is the angular rotational speed of rotating magnetic fields generated by the first stator 411, is the angular rotational speed of the magnetic flux converter 413, Ns is the number of poles of the magnetic flux converter 413, and Nh is the number of poles of the first stator 411.

Specifically, referring to the above formula, it is noted that the reduction gear ratio of the angular rotational speed of the rotating magnetic fields generated by the first stator 411 and the angular rotational speed of the first rotor 415 is proportional to the angular rotational speed of the magnetic flux converter 413.

In other words, as the angular rotational speed of the magnetic flux converter 413 is lowered, the reduction gear ratio is increased, thus enabling low-speed rotation of the drum 300. In contrast, as the angular rotational speed of the magnetic flux converter 413 is increased, the reduction gear ratio is decreased, thus enabling high-speed rotation of the drum 300.

Theoretically speaking, it is considered that, as the angular rotational speed of the magnetic flux converter 413 is increased, high-speed rotation of the drum 300 becomes easier. Actually, when the magnetic flux converter 413 rotates at a high speed, a problem occurs in that magnetic flux is abruptly changed and eddy current is generated while the rotating magnetic fields generated by the first stator 411 pass through the magnetic flux converter 413, which is rotating at a high speed, whereby the magnetic flux converter 413 or the first rotor 415 is heated, thus deteriorating transmission efficiency.

In order to solve the problem, the laundry treatment apparatus according to the present invention may be constructed to synchronize the angular rotational speed of the rotating magnetic fields generated by the first stator 411 with the angular rotational speed of the magnetic flux converter 413.

Hereinafter, two embodiments according to the present invention, which are constructed to solve the problem, will be described.

In a first embodiment, when the drum 300 rotates at a high speed, the laundry treatment apparatus may include an inverter driving circuit 630 in order to synchronize the angular rotational speed of the rotating magnetic fields generated by the first stator 411 with the angular rotational speed of the magnetic flux converter 413, which is rotatable with the second rotor 433, as shown in FIG. 7.

Referring to FIG. 7, the inverter driving circuit 630 may include a first inverter driving circuit 6301 for supplying current to the first stator 411 to generate rotating magnetic fields, and a second inverter driving circuit 6303 for supplying current to the second stator 431 to generate rotating magnetic fields.

Illustrative description will now be given with additional reference to FIGS. 4 and 5. The first stator core 4111 may include the ridges, which protrude radially outward, and around which the first coil 4113 is wound, and the first coil 4113 may be composed of six coils U11, V11, W11, U12, V12 and W12.

Similarly, the second coil 4313 may be composed of six coils U21, V21, W21, U22, V22 and W22.

Since the operating principle whereby the inverter driving circuit 630 supplies three-phase current to the first coil 4113 and the second coil 4313 to cause the first stator 411 and the second stator 431 to generate rotating magnetic fields is well known to those skilled in the art, a detailed description thereof is omitted.

The first inverter driving circuit 6301 and the second inverter driving circuit 6303 may be constructed to be identical to a three-phase circuit of a BLDC motor, which is usually used to supply three-phase current to the first coil 4113 and the second coil 4313 to generate rotating magnetic fields.

More specifically, the first inverter driving circuit 6301 may supply three-phase current to the first coil 4113, and the second inverter driving circuit 6303 may supply three-phase current to the second coil 4313. The first inverter driving circuit 6301 and the second inverter driving circuit 6303 may be controlled independently from each other.

As described above, when there is a great difference between the angular rotational speed of the rotating magnetic fields generated by the first stator 411 and the angular rotational speed of the magnetic flux converter 413 during high-speed rotation of the drum 300, a problem occurs in that eddy current is generated, thus deteriorating transmission efficiency. In order to solve the problem, the angular rotational speed of the first stator 411 may be synchronized with the angular rotational speed of the magnetic flux converter 413.

Since the magnetic flux converter 413 is constructed to rotate with the second rotor 433 of the second drive unit 430 in order to realize the synchronization between the angular rotational speeds, the second inverter driving circuit 6303 may control the supply of three-phase current such that the angular rotational speed of the magnetic flux converter 413 is synchronized with the angular rotational speed of the rotating magnetic fields generated by the first stator 411.

During low-speed rotation of the drum 300, the second inverter driving circuit 6303 may supply direct current to the second coil 4313. As shown in FIG. 6, since static poles are formed at the second stator 431 without generating rotating magnetic fields when direct current is supplied to the second coil 4313, the second rotor 433 is held and prevented from rotating.

Since the second rotor 433 is prevented from rotating, the magnetic flux converter 413, which is constructed to be rotatable with the second rotor 433, is also prevented from rotating.

When the magnetic flux converter 413 is held as described above, there is an effect of increasing the reduction gear ratio of the rotational force transferred from the first drive unit 410 without change of other elements.

Hereinafter, a second embodiment of the present invention is described with reference to FIGS. 8 and 9.

Since the basic system and construction of the second embodiment are substantially identical to those of the first embodiment except for an inverter driving circuit 630 and a magnetic flux converter holder 4131 provided at the magnetic flux converter 413, a redundant description thereof is omitted.

The first embodiment includes the first inverter driving circuit 6301 and the second inverter driving circuit 6303, which are controllable independently from each other in order to synchronize the angular rotational speed of the rotating magnetic fields generated by the first stator 411 with the angular rotational speed of the second rotor 433, which is rotatable with the magnetic flux converter 413 in the high-speed rotation mode of the drum 300. In contrast, the second embodiment may include the single inverter driving circuit 630 connected to the first coil 4113 and the second coil 4313 to supply three-phase current, as shown in FIG. 9.

In the case of having to synchronize the angular rotational speed of the rotating magnetic fields generated by the first stator 411 with the angular rotational speed of the magnetic flux converter 413 to rotate the drum at a high speed, a switch 670 provided at the inverter driving circuit 630 may be controlled to connect the first coil 4113 to the second coil 4313.

In the case of having to rotate the drum 300 at a low speed, the switch may be controlled to release the electrical connection between the first coil 4113 and the second coil 4313.

More preferably, the first coil 4113 for supplying three-phase current is first connected in series to the inverter driving circuit 630, and the first coil 4113 is then connected in series to the second coil 4313 such that the switch 670 is provided between the first coil 4113 and the second coil 4313 to open and close the connection therebetween.

Consequently, in the case of controlling the switch 670 to connect the first coil 4113 to the second coil 4313, the three-phase current, supplied from the inverter driving circuit 630, is supplied to the first coil 4113 and the second coil 4313, and thus the angular rotational speed of the rotating magnetic fields generated by the first stator 411 may be synchronized with the angular rotational speed of the magnetic flux converter 413 in the high-speed rotation mode of the drum 300.

In contrast, the switch 670 may be controlled to release the connection between the first coil 4113 and the second coil 4313 in the low-speed rotation mode of the drum 300. Consequently, the inverter driving circuit 630 may supply the three-phase current only to the first coil 4113 but not to the second coil 4313, which has been electrically disconnected from the first coil 4113. As a result, there is an effect of preventing un-necessary consumption of electric power.

As described above, the laundry treatment apparatus according to the present invention aims to hold the magnetic flux converter 413 to maximize the reduction gear ratio in the low-speed rotation mode of the drum 300. Even if the three-phase current is not supplied to the second coil 4313 due to opening of the switch 670, the magnetic flux converter 413 is not held and prevented from rotating. Accordingly, the second embodiment may further include the magnetic flux converter holder 4131 for holding the magnetic flux converter 413, as shown in FIG. 8.

Although the magnetic flux converter holder 4131 is provided at the housing of the rotating object to press the magnetic flux converter 413 in a direction perpendicular to the surface of the magnetic flux converter 413, as illustrated in the drawing, the magnetic flux converter holder 4131 may be modified into any configuration, and the mounting position and shape of the magnetic flux converter holder 4131 are not limited to those shown in the drawing.

MODE FOR THE INVENTION

Various embodiments have been described in the best mode for carrying out the invention.

INDUSTRIAL APPLICABILITY

The present invention provides a laundry treatment apparatus equipped with a drive unit, which is capable of reducing noise caused by vibrations.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The magnetic flux converter 413 serves to change the reduction gear ratio while the rotating magnetic fields generated by the first stator 411 are transferred to the first rotor 415.

The angular rotational speed of the magnetic flux converter 413 and the reduction gear ratio of the first drive unit 410 may be represented by the formula below.

$$Gr = \frac{k \cdot N_s \pm N_h}{N_s \pm N_h} = \frac{\frac{\omega 1}{\omega 2} \cdot N_s \pm N_h}{N_s \pm N_h} \propto \frac{1}{\omega 2}$$

wherein Gr is a reduction gear ratio, $\omega 1$ is the angular rotational speed of rotating magnetic fields generated by the first stator 411, $\omega 2$ is the angular rotational speed of the magnetic flux converter 413, Ns is the number of poles of the magnetic flux converter 413, and Nh is the number of poles of the first stator 411.

Specifically, referring to the above formula, it is noted that the reduction gear ratio of the angular rotational speed of the rotating magnetic fields generated by the first stator 411 and the angular rotational speed of the first rotor 415 is proportional to the angular rotational speed of the magnetic flux converter 413.

In other words, as the angular rotational speed of the magnetic flux converter 413 is lowered, the reduction gear ratio is increased, thus enabling low-speed rotation of the drum 300. In contrast, as the angular rotational speed of the magnetic flux converter 413 is increased, the reduction gear ratio is decreased, thus enabling high-speed rotation of the drum 300.

Theoretically speaking, it is considered that, as the angular rotational speed of the magnetic flux converter 413 is increased, high-speed rotation of the drum 300 becomes easier. Actually, when the magnetic flux converter 413 rotates at a high speed, a problem occurs in that magnetic flux is abruptly changed and eddy current is generated while the rotating magnetic fields generated by

The invention claimed is:

1. A laundry treatment apparatus comprising:
 a cabinet defining an appearance of the laundry treatment apparatus;
 a drum rotatably disposed in the cabinet; and
 a drive unit for rotating the drum,
 wherein the drive unit comprises:
  a first drive unit for generating rotational force required to rotate the drum; and
  a second drive unit connected with the first drive unit,
  wherein the first drive unit comprises:
   a first stator for generating first rotating magnetic fields;
   a magnetic flux converter rotatably disposed radially outside the first stator to change flux of the magnetic fields generated by the first stator; and
   a first rotor disposed radially outside the magnetic flux converter and rotated by the first rotating magnetic fields,
   wherein the magnetic flux converter rotates with the second drive unit, and
  wherein the second drive unit comprises:
   a second stator for generating second rotating magnetic fields; and
   a second rotor configured to rotate by the second rotating magnetic fields,
   wherein the second rotor is connected to the magnetic flux converter.

2. The laundry treatment apparatus of claim 1, further comprising:
 a first inverter driving circuit for supplying current to a first coil, which is wound around the first stator, to generate the first rotating magnetic fields; and
 a second inverter driving circuit for supplying current to a second coil, which is wound around the second stator, to generate the second rotating magnetic fields,
 wherein the first inverter driving circuit and the second inverter driving circuit supply current independently from each other.

3. The laundry treatment apparatus of claim 2, wherein, when the drum is rotated at or above a predetermined rotational speed, the first inverter driving circuit and the second inverter driving circuit supply current such that an angular rotational speed of the magnetic flux converter is the same as that of the first rotor.

4. The laundry treatment apparatus of claim 2, wherein, when the drum is rotated below a predetermined rotational speed, the second inverter driving circuit supplies current such that the second rotor does not rotate.

5. The laundry treatment apparatus of claim 4, wherein the second inverter driving circuit supplies direct current to the second coil to keep the second rotor from rotating.

6. The laundry treatment apparatus of claim 1, further comprising:
 a magnetic flux converter holder for selectively preventing rotation of the magnetic flux converter.

7. The laundry treatment apparatus of claim 6, further comprising:
 a first coil wound around the first stator;
 a second coil wound around the second stator;
 a switch disposed between the first coil and the second coil to selectively release an electrical connection between the first coil and second coil; and
 an inverter driving circuit for supplying current to the first coil and, when electrically connected via the switch, to the second coil.

8. The laundry treatment apparatus of claim 7, wherein, when the drum is rotated at or above a predetermined rotational speed, the switch is controlled to electrically connect the first coil to the second coil.

9. The laundry treatment apparatus of claim 7, wherein, when the drum is rotated below a predetermined rotational speed, the switch is controlled to release the electrical connection between the first coil and second coil so as to supply current for the inverter driving circuit to only the first coil.

10. The laundry treatment apparatus of claim 9, wherein, when the drum is rotated below a predetermined rotational speed, the magnetic flux converter holder holds the magnetic flux converter to prevent rotation of the magnetic flux converter.

* * * * *